United States Patent Office 2,882,296
Patented Apr. 14, 1959

2,882,296

2-DIETHYLAMINOETHYL 3-AMINO-2-ALKYOXY-BENZOATES AND THEIR PREPARATION

Raymond O. Clinton, North Greenbush, and Stanley C. Laskowski, Menands, N.Y., assignors to Sterling Drug Inc., New York, N.Y., a corporation of Delaware No Drawing. Application November 4, 1952
Serial No. 318,756

10 Claims. (Cl. 260—472)

This invention relates to 2-diethylaminoethyl 3-amino-2-alkoxybenzoates, to acid addition salts thereof and to the preparation of these compounds, wherein the 2-alkoxy substituent has from three to four carbon atoms.

These esters of our invention have useful pharmacological properties, for instance, local anesthetic activity. In addition to being highly potent local anesthetics, these esters have the unexpected properties of being less irritating and less toxic than corresponding known isomeric 2-diethylaminoethyl amino-alkoxybenzoates.

Our esters are prepared by reducing the corresponding 2-diethylaminoethyl 3-nitro-2-alkoxybenzoates. For example, 2-diethylaminoethyl 3-amino-2-n-propoxybenzoate was prepared by treating 2-diethylaminoethyl 3-nitro-2-n-propoxybenzoate with a reducing agent effective to reduce nitro to amino; 2-diethylaminoethyl 3-amino-2-n-butoxy-benzoate was prepared similarly by reducing 2-diethyl aminoethyl 3-nitro-2-n-butoxybenzoate. The reduction can be carried out either by chemical methods or by catalytic hydrogenation. Suitable chemical reducing agents include iron and hydrochloric acid, ferrous sulfate and ammonia, tin and hydrochloric acid, sodium hydrosulfite, etc. In practicing our invention we preferably used iron and hydrochloric acid. Catalysts suitable when catalytic hydrogenation is employed include Raney nickel, platinum, palladium and other catalysts generally effective to catalyze hydrogenation of nitro to amino.

The intermediate 2-diethylaminoethyl 3-nitro-2-alkoxy-benzoates were prepared by heating the appropriate 3-nitro-2-alkoxybenzoic acid with a 2-diethylaminoethyl halide. For example, heating 3-nitro-2-n-propoxybenzoic acid with 2-diethylaminoethyl chloride yields 2-diethylaminoethyl 3-nitro-2-n-propoxybenzoate. The 3-nitro-2-alkoxybenzoic acids were prepared by heating 3-nitro-2-hydroxybenzoic acid with the appropriate alkyl benzenesulfonate and potassium carbonate in refluxing xylene. For example, 3-nitro-2-n-propoxy-benzoic acid is formed by heating 3-nitro-2-hydroxybenzoic acid with n-propyl benzenesulfonate; similarly when n-butyl benzenesulfonate is used, the resulting compound is 3-nitro-2-n-butoxy-benzoic acid.

The 2-diethylaminoethyl 3-amino-2-alkoxybenzoates of our invention are therapeutically active whether employed in the form of their free base or in the form of their salts with relatively non-toxic organic or inorganic acids. Such acid addition salts are within the scope of our invention and they include the hydrochlorides, hydrobromides, sulfates, phosphates, citrates, sulfamates, tartrates, succinates, acetates, benzoates, oleates, and the like.

Specific embodiments of our invention are illustrated below.

3-nitro-2-alkoxybenzoic acids

*3-nitro-2-n-propoxybenzoic acid.*—A mixture of 50.0 g. (0.273 mole) of 3-nitro-2-hydroxybenzoic acid, 82.8 g. (0.601 mole) of anhydrous potassium carbonate and 900 ml. of xylene was refluxed with stirring under a water trap until no more water was evolved (one hour). To the slurry was then added 131 g. (0.655 mole) of n-propyl benzenesulfonate in one portion, and refluxing with stirring under the water trap was continued for another forty-eight hours. The mixture was filtered hot and the filter cake was washed thoroughly with hot toluene. The combined filtrates were evaporated to dryness at 25 mm. and 100° C. The residual oil was dissolved in 500 ml. of 95% ethanol and to this mixture was added a solution of 32.8 g. (0.819 mole) of sodium hydroxide in 1000 ml. of water. The resulting mixture was refluxed for four hours, the alcohol was removed in vacuo, and the aqueous solution was decolorized with decolorizing charcoal. The clear filtrate from the decolorization was acidified to Congo Red with concentrated hydrochloric acid, and the resulting cream-colored precipitate was collected and washed well with water. On drying at 45° C. in vacuo there was obtained 40.9 g. of crude acid (66.5% yield), melting at 82–83° C. After two recrystallizations from ethanol the product, 3-nitro-2-n-propoxybenzoic acid, melted at 88.0–88.5° C. (cor.).

*Analysis.*—Calcd. for $C_{10}H_{11}NO_5$: C, 53.33; H, 4.92; N, 6.22. Found: C, 53.65; H, 4.86; N, 6.21.

*3-nitro-2-n-butoxybenzoic acid.*—Following the foregoing procedure described for the preparation of 3-nitro-2-n-propoxybenzoic acid but using 50.0 g. of 3-nitro-2-hydroxybenzoic acid, 82.8 g. of anhydrous potassium carbonate, 900 ml. of xylene and 140.5 g. of n-butyl benzenesulfonate, with a reflux period of seventy-eight hours, there was obtained 3-nitro-2-n-butoxybenzoic acid, M.P. 56.3–58.0° C. when recrystallized twice from n-hexane.

*Analysis.*—Calcd. for $C_{11}H_{13}NO_5$: N, 5.86. Found: N, 5.81.

2-diethylaminoethyl 3-nitro-2-alkoxybenzoates

*2-diethylaminoethyl 3-nitro-2-n-propoxybenzoate.* — A mixture of 18.0 g. (0.075 mole) of 3-nitro-2-n-propoxy-benzoic acid, 10.6 g. (0.078 mole) of 2-diethylaminoethyl chloride and 175 ml. of isopropyl alcohol was refluxed for six and one-half hours. The resulting suspension was concentrated to dryness in vacuo and the residue was triturated with ether. The ether-insoluble solid was dissolved in water and the resulting solution was made basic with sodium hydroxide solution. The oily base was extracted with ethyl acetate and the ethyl acetate solution, after washing with water and drying, was evaporated to dryness in vacuo. The residual oily base, 2-diethylamino-ethyl 3-nitro-2-n-propoxybenzoate, weighed 25.4 g. (83% yield).

When 2-diethylaminoethyl 3-nitro-2-n-propoxybenzoate was treated with excess ethanolic picric acid solution a crystalline picrate was obtained; two recrystallizations from ethanol gave the pure picrate salt of M.P. 97.2–98.2° C. (cor.).

*Analysis.*—Calcd. for $C_{22}H_{27}N_5O_{12}$: $N_{Ti}$, 10.12. Found: $N_{Ti}$, 10.02.

A solution of 2-diethylaminoethyl 3-nitro-2-n-propoxy-benzoate in ethyl acetate was treated with an excess of a 20% solution of hydrogen chloride in ether. The resulting crystalline hydrochloride was collected and recrystallized twice from isopropyl alcohol, M.P. 118.4–121.4° C. (cor.).

*Analysis.*—Calcd. for $C_{16}H_{24}N_2O_5 \cdot HCl$: $N_{Ti}$, 3.88; Cl, 9.83. Found: $N_{Ti}$, 3.74; Cl, 9.89.

*2-diethylaminoethyl 3-nitro-2-n-butoxybenzoate.*—This preparation was carried out following the procedure described above for 2-diethylaminoethyl 3-nitro-2-n-propoxybenzoate but using 22.3 g. (0.093 mole) of 3-nitro-2-n-butoxybenzoic acid, 15.2 g. (0.110 mole) of 2-diethyl-aminoethyl chloride and 200 ml. of isopropyl alcohol. The resulting product, 2-diethylaminoethyl 3-nitro-2-n-butoxybenzoate, an oil, weighed 28.0 g. (82%).

The picrate salt of 2-diethylaminoethyl 3-nitro-2-n-butoxybenzoate melted at 79.5–81.1° C. (cor.) when recrystallized twice from isopropyl alcohol.

*Analysis.*—Calcd. for $C_{23}H_{29}N_5O_{12}$: $N_{Tl}$, 9.87. Found: $N_{Tl}$, 9.60.

The hydrochloride salt of 2-diethylaminoethyl 3-nitro-2-n-butoxybenzoate melted at 133.4–134.8° C. (cor.) when recrystallized twice from ethanol.

*Analysis.*—Calcd. for $C_{17}H_{26}N_2O_5 \cdot HCl$: $N_{Tl}$, 3.74; Cl, 9.46. Found: $N_{Tl}$, 3.68; Cl. 9.55.

2-diethylaminoethyl 3-amino-2-alkoxybenzoates

*2-diethylaminoethyl 3-amino-2-n-propoxybenzoate.* — A stirred mixture of 12.6 g. (0.226 mole) of powdered iron, 250 ml. of 50% aqueous ethanol and 1 ml. of concentrated hydrochloric acid was heated to boiling on the steam bath. To this mixture, with stirring, was added 12.2 g. (0.0376 mole) of 2-diethylaminoethyl 3-nitro-2-propoxybenzoate in portions during fifteen minutes. The mixture was then stirred just below the boiling point for thirty minutes, treated with 6.5 g. of sodium bicarbonate and stirred with heating another ten minutes. The resulting black or brown suspension was filtered while hot and the filter cake was washed thoroughly with hot ethanol. The combined filtrates were evaporated to a small volume in vacuo, diluted with water, and the base was extracted into ethyl acetate. The ethyl acetate extract was washed with water, dried over anhydrous calcium sulfate, and evaporated to dryness in vacuo. There was obtained, as an oily base, 9.3 g. (84%) of 2-diethylaminoethyl 3-amino-2-n-propoxybenzoate.

The dipicrate of 2-diethylaminoethyl 3-amino-2-n-propoxybenzoate melted at 97.9–98.9° C. (cor.) when recrystallized twice from ethanol.

*Analysis.*—Calcd. for $C_{28}H_{32}N_8O_{17}$: $N_{Tl}$, 11.17. Found: $N_{Tl}$, 11.02.

The monohydrochloride of 2-diethylaminoethyl 3-amino-2-n-propoxybenzoate was prepared by treating an ethyl acetate solution of the basic ester with slightly less than the theoretical amount of a solution of hydrogen chloride in ether. The precipitated salt, when recrystallized twice from isopropanol-ether, melted at 131.0–132.0° C. (cor.).

*Analysis.*—Calcd. for $C_{16}H_{26}N_2O_3 \cdot HCl$: N, 8.47; Cl, 10.72. Found: N, 8.26; Cl, 10.62.

*2-diethylaminoethyl 3-amino-2-n-butoxybenzoate.* — This preparation was carried out following the procedure described above for 2-diethylaminoethyl 3-amino-2-n-propoxybenzoate but using 14.4 g. (0.0414 mole) of 2-diethylaminoethyl 3-nitro-2-n-butoxybenzoate, 13.9 g. (0.248 mole) of powdered iron, 300 ml. of 50% aqueous ethanol, 1 ml. of concentrated hydrochloric acid and (for neutralization) 8.0 g. of sodium bicarbonate. There was thus obtained, as an oil, 12.1 g. (95%) of 2-diethylaminoethyl 3-amino-2-n-butoxybenzoate.

2-diethylaminoethyl 3-amino-2-n-butoxybenzoate monohydrochloride melted at 118.4–119.6° C. (cor.) when recrystallized twice from isopropanol-ether (anhydrous).

*Analysis.*—Calcd. for $C_{17}H_{28}N_2O_3 \cdot HCl$: N, 8.12; Cl, 10.28. Found: N, 7.88; Cl, 10.23.

We claim:
1. A member of the group consisting of a 2-diethylaminoethyl 3-amino-2-alkoxybenzoate where the 2-alkoxy substituent has from three to four carbon atoms and non-toxic acid addition salts thereof.
2. 2-diethylaminoethyl 3-amino-2-n-propoxybenzoate.
3. A non-toxic acid addition salt of 2-diethylaminoethyl 3-amino-2-n-propoxybenzoate.
4. 2-diethylaminoethyl 3-amino-2-n-propoxybenzoate hydrochloride.
5. 2-diethylaminoethyl 3-amino-2-n-butoxybenzoate.
6. A non-toxic acid addition salt of 2-diethylaminoethyl 3-amino-2-n-butoxybenzoate.
7. 2-diethylaminoethyl 3-amino-2-n-butoxybenzoate hydrochloride.
8. A process of preparing a 2-diethylaminoethyl 3-amino-2-alkoxybenzoate where the 2-alkoxy substituent has from three to four carbon atoms which comprises treating the corresponding 2-diethylaminoethyl 3-nitro-2-alkoxybenzoate with a reducing agent effective to reduce nitro to amino.
9. A process of preparing 2-diethylaminoethyl 3-amino-2-n-propoxybenzoate which comprises treating 2-diethylaminoethyl 3-nitro-2-n-propoxybenzoate with a reducing agent effective to reduce nitro to amino.
10. A process of preparing 2-diethylaminoethyl 3-amino-2-n-butoxybenzoate which comprises treating 2-diethylaminoethyl 3-nitro-2-n-butoxybenzoate with a reducing agent effective to reduce nitro to amino.

References Cited in the file of this patent

UNITED STATES PATENTS

| | | |
|---|---|---|
| 2,342,142 | Harris et al. | Feb. 22, 1944 |
| 2,689,248 | Clinton et al. | Sept. 14, 1954 |

FOREIGN PATENTS

| | | |
|---|---|---|
| 265,343 | Switzerland | Mar. 1, 1950 |

OTHER REFERENCES

McIntyre et al.: Nebraska State Med. J. 35, 100–104 (1950).